US011630705B1

(12) United States Patent
Williams

(10) Patent No.: US 11,630,705 B1
(45) Date of Patent: Apr. 18, 2023

(54) DYNAMIC GENERATION OF CLOUD PLATFORM APPLICATION PROGRAMMING INTERFACE CALLS

(71) Applicant: Virtustream IP Holding Company LLC, Bethesda, MD (US)

(72) Inventor: David Williams, Snohomish, WA (US)

(73) Assignee: Virtustream IP Holding Company LLC, Bethesda, MD (US)

( * ) Notice: Subject to any disclaimer, the term of this patent is extended or adjusted under 35 U.S.C. 154(b) by 6 days.

(21) Appl. No.: 17/565,595

(22) Filed: Dec. 30, 2021

(51) Int. Cl.
G06F 9/44 (2018.01)
G06F 9/50 (2006.01)
G06F 9/445 (2018.01)
G06F 9/54 (2006.01)
G06F 8/41 (2018.01)
G06F 9/4401 (2018.01)

(52) U.S. Cl.
CPC ............ G06F 9/5072 (2013.01); G06F 8/451 (2013.01); G06F 9/4416 (2013.01); G06F 9/44521 (2013.01); G06F 9/547 (2013.01)

(58) Field of Classification Search
None
See application file for complete search history.

(56) References Cited

U.S. PATENT DOCUMENTS 10,999,413 B1 * 5/2021 Gino .................... G06F 9/5072
2017/0212737 A1 * 7/2017 Wolfram .................. G06F 8/38
2020/0192661 A1 * 6/2020 Doyle ....................... G06F 8/73
2021/0132981 A1 * 5/2021 Thakkar .................. G06F 9/547
2022/0035661 A1 * 2/2022 Bahrami ................... G06F 8/34
2022/0066847 A1 * 3/2022 Liu .......................... G06F 9/541
2022/0334892 A1 * 10/2022 Godwin .................. G06F 9/547

OTHER PUBLICATIONS

Python Software Foundation, "Find, Install and Publish Python Packages with the Python Package Index," https://pypi.org/, Accessed Dec. 9, 2021, 3 pages.
Stackstorm, "Create and Contribute a Pack," https://docs.stackstorm.com/reference/packs.html, Accessed Dec. 9, 2021, 10 pages.
Google, "Google Cloud APIs," https://cloud.google.com/apis/docs/overview, Dec. 15, 2021, 3 pages.
StackStorm, "StackStorm Overview," https://docs.stackstorm.com/overview.html, Accessed Dec. 9, 2021, 3 pages.

* cited by examiner

*Primary Examiner* — Insun Kang
(74) *Attorney, Agent, or Firm* — Ryan, Mason & Lewis, LLP

(57) ABSTRACT

An apparatus comprises a processing device configured to receive a request to execute an action on cloud assets of a cloud platform utilizing an application programming interface (API) exposed by the cloud platform, the request comprising a set of keyword arguments, and to generate a code class instance for the API. The processing device is also configured to instantiate, via the generated code class instance, a client for the cloud platform utilizing a first subset of arguments in the set of keyword arguments, to determine from the set of keyword arguments an identifier of the action to be executed, and to execute the action by running a function of the generated code class instance, the function dynamically generating an API call utilizing the instantiated client for the cloud platform, the determined identifier, and a second subset of arguments in the set of keyword arguments.

20 Claims, 11 Drawing Sheets

```
class CloudPlatformComputeClass:
    def __init__(credentials):
        self.client = discovery.build('compute', 'v1', credentials=credentials)

def create_network(project, network_name, cidr_range):
        project = project
        network_body = {
            "name": network_name,
            "IPv4Range": cidr_range
        }
        request = self.client.networks().insert(project=project, body=network_body)
        response = request.execute()
        return response def create_subnet(project, region, subnet_name, network_id, cidr_range):
        project = project
        region = region
        subnet_body = {
            "name": subnet_name,
            "network": network_id,
            "ipCidrRange": cidr_range
        }
        request = self.client.subnetworks().insert(project=project, region=region, body=subnet_body)
        response = request.execute()
        return response
```

FIG. 3A

```
cloudplatform_manager = CloudPlatformComputeClass(my_credentials)

network_response = cloudplatform_manager.create_network("my_project", "my_network_name", "10.0.0.0/8")

subnet_response = cloudplatform_manager.create_subnet("my_project", "my_region", "my_subnet_name", network_response['selfLink'], "10.0.1.0/24")
```

```
class CloudPlatformGenericClass:
    def __init__(api, api_version, credentials):
        self.client = discovery.build(api, api_version, credentials=credentials)

def run_my_cloudplatform_method(**kwargs):
        method_name = method_name from kwargs
        delete method name from kwargs
        kwargs = cleanup_kwargs(kwargs) # to remove blank arguments if any are present
        method_list = split on periods in method_name
        method = self.client
        for i in lenth(method_list):
            next_method = method_list[i]
            if i is less than total length of method_list – 1:
                # set method to new called function and continue loop
                method = getattribute(method, next_method)()
            if i is equal to length of method_list – 1:
                # here the last method is obtained, but instead of just calling it blank like
                # before, i.e., (), kwargs is passed in and execute() is run to return the result
                return getattribute(method, next_method)(**kwargs).execute()
```

```
generic_cloudplatform_manager = CloudPlatformGenericClass('compute', 'v1', my_credentials)

network_response = generic_cloudplatform_manager.run_my_cloudplatform_method(**{
    "method_name": "networks.insert",
    "project": "my_project",
    "body": {
        "name": "my_network_name",
        "IPv4Range": "10.0.0.0/8"
    }
})

subnet_response = generic_cloudplatform_manager.run_my_cloudplatform_method(**{
    "method_name": "subnetworks.insert",
    "project": "my_project",
    "region": "my_region",
    "body": {
        "name": "my_subnet_name",
        "network": network_response['selfLink'],
        "ipCidrRange": "10.0.1.0/24"
    }
})
```

DYNAMIC GENERATION OF CLOUD PLATFORM APPLICATION PROGRAMMING INTERFACE CALLS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing, and more particularly to techniques for managing information processing systems comprising cloud infrastructure.

BACKGROUND

Information processing systems increasingly utilize reconfigurable virtual resources to meet changing user needs in an efficient, flexible and cost-effective manner. For example, cloud computing environments implemented using various types of virtualization techniques are known. These illustratively include operating system level virtualization techniques such as Linux containers. Such containers may be used to provide at least a portion of the cloud infrastructure of a given information processing system. Other types of virtualization such as virtual machines implemented using a hypervisor can additionally or alternatively be used. However, significant challenges remain in implementation of cloud infrastructure. For example, it is often unduly difficult to provision cloud services in multi-cloud environments.

SUMMARY

Illustrative embodiments of the present disclosure provide techniques for dynamic generation of cloud platform application programming interface calls.

In one embodiment, an apparatus comprises at least one processing device comprising a processor coupled to a memory. The at least one processing device is configured to perform the steps of receiving a request to execute an action on one or more cloud assets of a cloud platform utilizing an application programming interface exposed by the cloud platform, the request comprising a set of keyword arguments, and generating a code class instance for the application programming interface exposed by the cloud platform. The at least one processing device is also configured to perform the steps of instantiating, via the generated code class instance, a client for the cloud platform utilizing a first subset of arguments in the set of keyword arguments, determining, from the set of keyword arguments, an identifier of the action to be executed on the one or more cloud assets of the cloud platform utilizing the application programming interface exposed by the cloud platform, and executing the action on the one or more cloud assets of the cloud platform by running a function of the generated code class instance, the function dynamically generating an application programming interface call in the application programming interface exposed by the cloud platform utilizing the instantiated client for the cloud platform, the determined identifier, and a second subset of arguments in the set of keyword arguments.

These and other illustrative embodiments include, without limitation, methods, apparatus, networks, systems and processor-readable storage media.

BRIEF DESCRIPTION OF THE DRAWINGS

FIGS. 3A and 3B shows pseudocode for creating and utilizing static functions for running cloud platform application programming interface action calls in an illustrative embodiment.

FIGS. 4A and 4B show pseudocode for creating and utilizing a dynamic function for running cloud platform application programming interface action calls in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
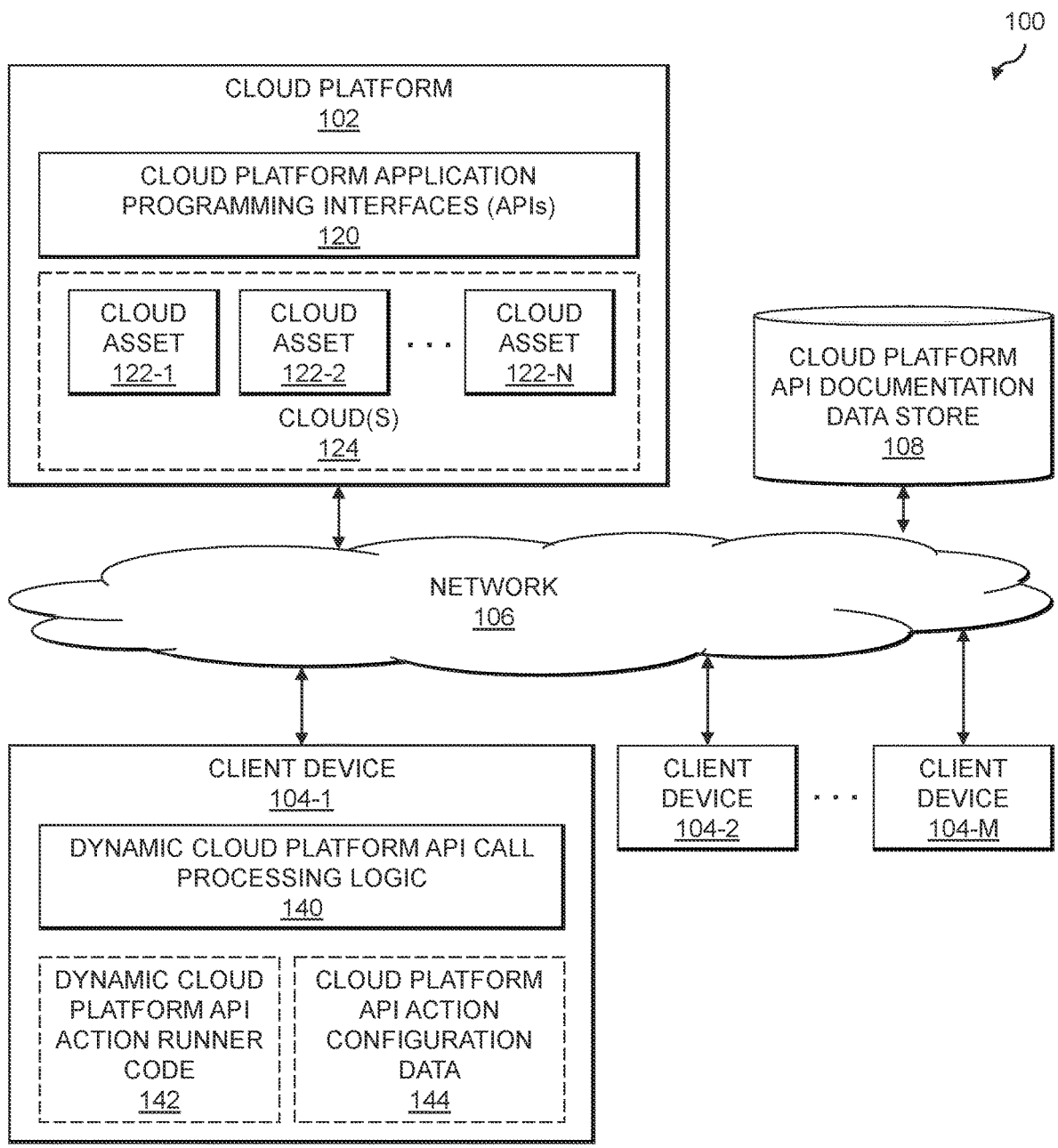
FIG. 1 is a block diagram of an information processing system configured for dynamic generation of cloud platform application programming interface calls in an illustrative embodiment.

FIG. 1 shows an information processing system 100 configured in accordance with an illustrative embodiment. The information processing system 100 is assumed to be built on at least one processing platform and provides functionality for dynamic generation of cloud platform application programming interface (API) calls. The information processing system 100 includes a cloud platform 102 which exposes one or more cloud platform APIs 120 for performing actions on or utilizing a set of cloud assets 122-1, 122-2, ... 122-N (collectively, cloud assets 122) on one or more clouds 124 of the cloud platform 102. The cloud platform APIs 120 may define any number of actions that can be performed on or utilizing the cloud assets 122, including but not limited to instantiating and/or deleting ones of the cloud assets 122, modifying configurations of the cloud assets 122, etc. The cloud assets 122 may comprise physical and virtual computing resources. Physical computing resources may include physical hardware such as servers, storage systems, networking equipment, Internet of Things (IoT) devices, health monitoring devices or other types of wearable devices, satellite devices, other types of processing and computing devices, etc. Virtual computing resources may include virtual machines (VMs), software containers (also referred to herein as containers), etc.

As shown in FIG. 1, a set of client devices 104-1, 104-2, . . . 104-M (collectively, client devices 104) are coupled to the cloud platform 102 via network 106. The client devices 104 are assumed to utilize the cloud platform APIs 120 exposed by the cloud platform 102 to manage subsets of the cloud assets 122 which are owned or otherwise associated with end-users of different ones of the client devices 104.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc. In some embodiments, one or more of the client devices 104 may represent another cloud platform (e.g., distinct from the cloud platform 102). For example, the client device 104-1 may be associated with another cloud platform that interacts with the cloud platform 102, with the cloud platform APIs 120 facilitating interoperability between the two cloud platforms. In other embodiments, one or more of the client devices 104 may represent one or more of the cloud assets 122 of the cloud platform 102. For example, the client device 104-1 may represent a given one of the cloud assets 122-1 that is configure to interface with other ones of the cloud assets 122-2 through 122-N utilizing the cloud platform APIs 120. Various other examples are possible.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

In some embodiments, the cloud platform 102 is operated by an enterprise, and the client devices 104 are operated by users of the enterprise. The cloud platform 102 may therefore be referred to as an enterprise system or enterprise cloud. As used herein, the term "enterprise system" is intended to be construed broadly to include any group of systems or other computing devices. In some embodiments, an enterprise system includes cloud infrastructure such as the one or more clouds 124, where the clouds 124 may comprise one or more public clouds, one or more private clouds, one or more hybrid clouds, combinations thereof, etc. The cloud infrastructure may host at least a portion of the client devices 104 as noted above. The cloud platform 102 in some embodiments hosts cloud assets 122 that are associated with multiple enterprises (e.g., two or more different businesses, organizations or other entities).

The network 106 coupling the cloud platform 102 and the client devices 104 is assumed to comprise a global computer network such as the Internet, although other types of networks can be used, including a wide area network (WAN), a local area network (LAN), a satellite network, a telephone or cable network, a cellular network, a wireless network such as a WiFi or WiMAX network, or various portions or combinations of these and other types of networks.

Also coupled to the network 106 is a cloud platform API documentation data store 108, which is assumed to comprise documentation or information relating to the cloud platform APIs 120 that are exposed by the cloud platform 102. Such documentation or other information may include information relating to the various actions that may be called using the cloud platform APIs 120, parameters that are used in calling such actions, expected result or output formats, etc. Although shown as external to the cloud platform 102 in the FIG. 1 embodiment, it should be appreciated that in other embodiments the cloud platform API documentation data store 108 may be implemented at least partially internal to the cloud platform 102. The cloud platform API documentation data store 108 may be implemented using one or more storage systems.

The storage systems implementing the cloud platform API documentation data store 108 may comprise a scale-out all-flash content addressable storage array or other type of storage array. The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the cloud platform 102, the client devices 104 and the cloud platform API documentation data store 108, as well as to support communication between the cloud platform 102, the client devices 104, the cloud platform API documentation data store 108 and other related systems and devices not explicitly shown.

The client devices 104, as noted above, are configured to utilize the cloud platform APIs 120 exposed by the cloud platform 102 to perform various actions on or utilizing the cloud assets 122 of the clouds 124 operated by the cloud platform 102. In some embodiments, the client devices 104 are configured with functionality for automating cloud platform API calls utilizing dynamic cloud platform API call processing logic 140. The dynamic cloud platform API call processing logic 140 is illustratively configured to instantiate a class of dynamic cloud platform API action runner code 142 to run various actions, without requiring manual coding of each action that is to be performed utilizing the cloud platform APIs 120. Instead, the dynamic cloud platform API call processing logic 140 is able to instantiate class with the correct credentials, API and API version information from a set of input parameters to create a client specific for the cloud platform 102 and the cloud platform APIs 120 that the client device 104-1 is trying to use. Remaining portions of the input parameters are passed to a designated function within the instantiated class that cleans the input parameters, performs formatting utilizing cloud platform API action configuration data 144, and executes the requested actions. The cloud platform API action configuration data 144 may provide a dictionary that includes the parameters that the cloud platform APIs 120 need to execute the requested action. The cloud platform API action configuration data 144 may be built or populated utilizing information from the cloud platform API documentation data store 108.

Although shown as elements of the client device 104-1 in the FIG. 1 embodiment, the dynamic cloud platform API call processing logic 140, dynamic cloud platform API action runner code 142, and the cloud platform API action configuration data 144 may in other embodiments be implemented at least in part external to the client device 104-1, for example, as part of stand-alone servers, sets of servers or other types of systems coupled via one or more networks to the client device 104-1 and the cloud platform 102.

The cloud platform 102 and client devices 104 in the FIG. 1 embodiment are assumed to be implemented using at least one processing device. Each such processing device generally comprises at least one processor and an associated memory, and implements at least a portion of the functionality of the various logic described herein.

It is to be appreciated that the particular arrangement of the cloud platform 102, the client devices 104 and cloud platform API documentation data store 108 illustrated in the FIG. 1 embodiment is presented by way of example only, and alternative arrangements can be used in other embodiments. For example, in some cases the cloud platform 102, one or more of the client devices 104, and/or the cloud platform API documentation data store 108 may be co-located. At least portions of the dynamic cloud platform API call processing logic 140 may be implemented at least in part in the form of software that is stored in memory and executed by a processor.

It is to be understood that the particular set of elements shown in FIG. 1 for dynamic generation of cloud platform API calls is presented by way of illustrative example only, and in other embodiments additional or alternative elements may be used. Thus, another embodiment may include additional or alternative systems, devices and other network entities, as well as different arrangements of modules and other components.

The cloud platform 102, client devices 104, the cloud platform API documentation data store 108 and other portions of the system 100, as described above and in further detail below, may be part of cloud infrastructure.

The cloud platform 102, client devices 104, the cloud platform API documentation data store 108 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The cloud platform 102, client devices 104, and the cloud platform API documentation data store 108, or components thereof, may be implemented on respective distinct processing platforms, although numerous other arrangements are possible. For example, in some embodiments at least portions of the cloud assets 122 and the client devices 104 are implemented on the same processing platform. Further, one or more of the client devices 104 can be implemented at least in part within at least one processing platform that implements at least a portion of the cloud platform 102 and/or the cloud platform API documentation data store 108.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the cloud platform 102, the client devices 104 and the cloud platform API documentation data store 108, or portions or components thereof, to reside in different data centers. Numerous other distributed implementations are possible.

Additional examples of processing platforms utilized to implement the cloud platform 102, the client devices 104, the cloud platform API documentation data store 108 and other components of the system 100 in illustrative embodiments will be described in more detail below in conjunction with FIGS. 7 and 8.

It is to be appreciated that these and other features of illustrative embodiments are presented by way of example only, and should not be construed as limiting in any way.

Figure 2:
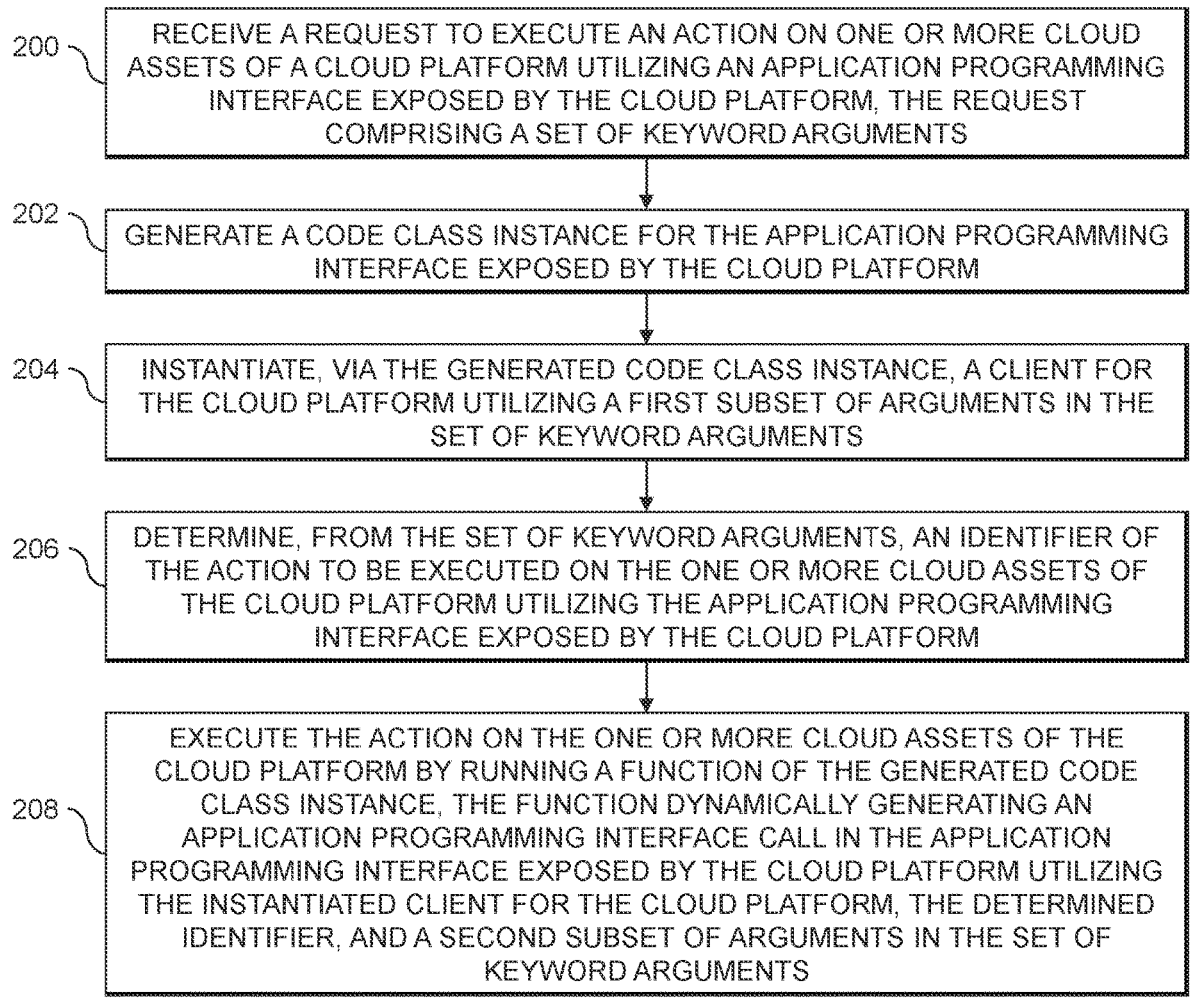
FIG. 2 is a flow diagram of an exemplary process for dynamic generation of cloud platform application programming interface calls in an illustrative embodiment.

An exemplary process for dynamic generation of cloud platform API calls will now be described in more detail with reference to the flow diagram of FIG. 2. It is to be understood that this particular process is only an example, and that additional or alternative processes for dynamic generation of cloud platform API calls may be used in other embodiments.

In this embodiment, the process includes steps 200 through 208. These steps are assumed to be performed utilizing the cloud platform APIs 120 of the cloud platform 102 and the dynamic cloud platform API call processing logic 140. The process begins with step 200, receiving a request to execute an action on one or more cloud assets (e.g., cloud assets 122) of a cloud platform (e.g., cloud platform 102) utilizing an API (e.g., cloud platform APIs 120) exposed by the cloud platform. The request comprises a set of keyword arguments. The one or more cloud assets of the cloud platform comprise at least one of virtual computing resources and physical computing resources. The request to execute the action on the one or more cloud assets of the cloud platform comprises at least one of: a request to create a given one of the one or more cloud assets; and a request to modify a configuration of the given one of the one or more cloud assets. This may include, for example, configuration of software that runs on the given one of the one or more cloud assets.

In step 202, a code class instance is generated for the API exposed by the cloud platform. A client for the cloud platform is instantiated via the generated code class instance in step 204, utilizing a first subset of arguments in the set of keyword arguments. The first subset of arguments in the set of keyword arguments may comprise an identifier of the cloud platform API, an identifier of a given version of the cloud platform API, and a set of credentials for the cloud platform. The first subset of arguments may be removed from the set of keyword arguments subsequent to instantiating the client for the cloud platform.

An identifier (e.g., a method name) of the action to be executed on the one or more cloud assets of the cloud platform utilizing the API exposed by the cloud platform is determined in step 206 from the set of keyword arguments. In step 208, the action is executed on the one or more cloud assets of the cloud platform by running a function (e.g., a run method function) of the generated code class instance. The function dynamically generates an API call in the API exposed by the cloud platform utilizing the instantiated client for the cloud platform, the determined identifier, and a second subset of arguments in the set of keyword arguments. The function of the code class may be generic to each of a plurality of different API calls (e.g., all API calls) in the API exposed by the cloud platform.

Running the function of the generated code class instance may comprise storing the determined identifier in a separate variable, and removing the determined identifier from the set of arguments. Running the function of the generated code class instance may further comprise cleaning the second subset of arguments in the set of keyword arguments, the second subset of arguments in the set of keyword arguments comprising remaining arguments in the set of keyword arguments other than the first subset of arguments and the determined identifier. Cleaning the second subset of arguments in the set of keyword arguments may comprise removing any remaining arguments in the set of keyword arguments that have blank values.

Running the function of the generated code class instance may further comprise creating a list by splitting the determined identifier based at least in part on one or more designated delimiter characters, and iterating through the created list to generate a call for the function of the generated code class instance. The one or more designated delimiter characters may comprise periods. Iterating through the created list to generate a call for the function of the generated code class instance may comprise setting a method variable to an identifier of the instantiated client for the cloud platform and, for each entry in the created list, comparing an index value of a current entry in the list to a total number of entries in the created list. Iterating through the created list to generate a call for the function of the generated code class instance may further comprise, responsive to the index value of the current entry in the list being less than a total number of entries in the created list minus one, appending the current entry of the created list to the method variable and incrementing the index value. Iterating through the created list to generate a call for the function of the generated code class instance may further comprise, responsive to the index value of the current entry in the list being equal to a total number of entries in the created list minus one: appending the current entry of the created list to the method variable; and generating the method call comprising (i) the method variable with the second subset of arguments in the set of arguments passed as parameters and (ii) an execution instruction.

A cloud platform may expose one or more application programming interfaces (APIs) that enable various actions to be performed in cloud assets of that cloud platform. Conventional approaches for utilizing cloud platform APIs typically involve a developer that writes code (e.g., functions) to do whatever action that the developer is seeking to perform on the cloud platform. Consider, as an example, a developer that wants to add in the ability to create a network on one or more cloud assets of a cloud platform. The developer may add to their code a function (e.g., "create_network") that uses instructions provided by an operator of the cloud platform. Such instructions may include a set of arguments to be provided for a particular API call, as well as the API call result.

FIG. 3A illustrates an example of pseudocode 300 that a developer would write for each task or action to be performed on a particular cloud platform (e.g., denoted "CloudPlatform" in the pseudocode 300). When the developer wants to call this code to make a network and a subnet, the pseudocode 305 shown in FIG. 3B may be utilized. Such an approach leads to "technical debt" (e.g., the future cost of reworking of code that is a result of using an easier or quicker solution instead of taking the time to use a better solution that may take longer to code). The approach of FIGS. 3A and 3B, for example, may lead to longer development times in the future due to the developer always having to write new code every time a new cloud platform API feature needs to be added. In some cases, depending on the developer, a new class may be required for every "type" of cloud platform API action to be called (e.g., compute, cloud resource manager, domain name system (DNS), etc.).

Illustrative embodiments provide a solution that enables running any cloud platform API action call (e.g., including cloud platform API calls across multiple versions of the cloud platform API) without requiring any code changes. To do so, some embodiments create a dynamic function as illustrated in the pseudocode 400 of FIG. 4A. When the developer wants to call any action in the cloud platform API (e.g., for the cloud platform denoted "CloudPlatform"), the developer can simply instantiate the class of the pseudocode 400 with any cloud platform API and version thereof that is required, and call the function with their data in a dictionary (e.g., a JavaScript Object Notation (JSON) dictionary) that includes the parameters that the cloud platform API needs (e.g., as determined from documentation provided by the cloud platform) as well as the method name (e.g., "method_name").

To analogize to the example tasks shown in the pseudocode 300 and 305 of FIGS. 3A and 3B, the pseudocode 400 of FIG. 4A may be used to perform the tasks of creating a network and subnetwork on cloud assets using cloud platform API calls. Here, however, the same small section of code (e.g., pseudocode 400 of FIG. 4A) may be re-used as illustrated in the pseudocode 405 of FIG. 4B. The pseudocode 405 of FIG. 4B accomplishes the same two cloud platform API calls as the pseudocode 305 of FIG. 3B, but uses the same underlying code (e.g., the pseudocode 400 of FIG. 4A) rather than having to write out different code for each method (e.g., as in the pseudocode 300 of FIG. 3A). With the approach illustrated in the pseudocode 400 and 405 of FIGS. 4A and 4B, not only do developers not have to write new code for adding new features, developers do not even have to write new code when a new cloud platform API version releases. The same generic class (e.g., the pseudocode 400 of FIG. 4A) can be used as-is for new cloud platform API versions.

Implementation of the pseudocode 400 and 405 of FIGS. 4A and 4B proceeds as follows. For the first code call (network_response) in the pseudocode 405, the keyword arguments (kwargs) includes "method_name", "project" and "body". The value of method_name is set to "networks.insert", and "method_name":="networks.insert" is removed from kwargs. The method list is split on the periods in method_name, and thus the method_list is {networks, insert} and has a length of 2. The value of method is set to "self.client", where self.client is set via the initiation of the CloudPlatformGenericClass as "discovery.build(api, api_version, credentials=credentials). The method_list is then iterated through. For i=0, next method is set to "networks" and the first portion of the for loop is followed (e.g., as i=0 is less than the total length of the method_list minus 1) and method is set as "getattribute(self.client, 'networks')()" which is the same as saying "selfclient.networks()". For i=1, next_method is set to "insert" and the second portion of the for loop is followed (e.g., as i=1 is equal to the total length of the method_list minus 1) to return "getattribute(self.client.networks, 'insert')(kwargs).execute() which is the same as saying "self.client.networks().insert(project, body).execute()". As per the pseudocode 405**, project is set as "my_project" and body includes name and IPv4Range parameters with values of "my_network_name" and "10.0.0.0/8."

For the second code call (subnet_response) in the pseudocode 405, the keyword arguments (kwargs) includes "method_name", "project", "region" and "body". The value of method_name is set to "subnetworks.insert", and "method_name":="subnetworks.insert" is removed from kwargs. The method list is split on the periods in method name, and thus the method list is {subnetworks, insert} and has a length of 2. The value of method is set to "self client", where self client is set via the initiation of the CloudPlatformGenericClass as "discovery.build(api, api_version, credentials=credentials). The method_list is then iterated through. For i=0, next_method is set to "subnetworks" and the first portion of the for loop is followed (e.g., as i=0 is less than the total length of the method_list minus 1) and method is set as "getattribute(self.client, 'subnetworks')()" which is the same as saying "self.client.subnetworks()". For i=1, next_method is set to "insert" and the second portion of the for loop is followed (e.g., as i=1 is equal to the total length of the method_list minus 1) to return "getattribute(self.client.subnetworks, 'insert')(kwargs).execute() which is the same as saying "self.client.subnetworks().insert(project, region, body).execute()". As per the pseudocode 405**, project is set as "my_project", region is set as "my_region" and body includes name, network and ipCidrRange parameters with values of "my_subnet_name", "network_response ['selfLink']" and "10.0.1.0/24."

It should be noted that, instead of separating the keyword arguments out like they are listed in the CloudPlatform API documentation, they are sent all at once via the "kwargs" variable. The "kwargs" in the case of networks.insert contains both the project parameter and the body parameters that the CloudPlatform API requires. Similarly, "kwargs" in the case of subnetworks.insert contains the project, region and body parameters that the CloudPlatform API requires. Because method_name was previously removed from "kwargs" this works since the pseudocode 405 defines the data in the original method calls exactly as the API needs it already. For networks.insert, the "project" and "body" are all in a dictionary sent as "kwargs" and are unchanged based on what the CloudPlatform API documentation says that the "networks.insert" CloudPlatform API call needs to work. Similarly, for subnetworks.insert, the "project", "region" and "body" are all in the dictionary sent as "kwargs" and are unchanged based on what the CloudPlatform API documentation says that the "subnetworks.insert" CloudPlatform API call needs to work. Parameters (e.g., api, api_version, credentials, method_name) are removed from kwargs before passing them through to make this work. The remaining kwargs are "cleaned" to remove any that may have been sent with an empty value.

In some embodiments, code is utilized which provides a dynamic way to run any cloud platform API call of a given cloud platform (e.g., such as Google Cloud Platform (GCP)) through automation. This advantageously resolves the complexity for developing a cloud platform pack (e.g., a GCP pack) and provides the ability to test it properly. The cloud platform "pack" may be, for example, a StackStorm® pack. StackStorm® is a platform for integration and automation across services and tools, which may plug in to a particular environment via extensible adapters such as packs. A pack is the unit of content deployment, and is used to simplify management and sharing of content by grouping triggers and actions (e.g., integrations) and rules and workflows (e.g., automations). The documentation for creating a pack in StackStorm® instructs a developer to create an action directory full of code files (e.g., python (.py) or shell script (.sh) files), one for each action. This results in a directory structure that looks clustered, as well as having the downside of needing to write code for every action that is created. Using the techniques described herein, however, the action directory need only contain the configuration files (e.g., YAML files) for the actions, and two code files (e.g., .py or .sh files) in a library (lib) directory, which ends up being much cleaner.

Another disadvantage with conventional approaches such as following the official conventional StackStorm® documentation, is that because of a certain StackStorm® import in the code files (e.g., .py or .sh files) that get ran, which only appears in StackStorm® itself rather than as part of an existing package (e.g., an existing Python package imported from the Python Package Index (PyPi)), a developer cannot write valid or useful unit tests for the code. As a result, developers must run StackStorm® code which has never actually been unit tested. With the conventional approach, developers must run their code fully in StackStorm® to test if it is working properly. Using the techniques described herein, however, code is unit testable and has 100% code coverage for unit tests.

In some embodiments, a pack is developed for a particular cloud platform, referred to below as CloudPlatform, and contains a single action (e.g., a Python action) called cloudplatform.run_cloudplatform_cloud_method, as opposed to the many actions which would conventionally be followed for developing a pack. In some embodiments, the code for this action is not in the same directory as the action configuration files (e.g., YAML file), but is instead in a library (lib) directory in the same folder for cleanliness. The action itself points to a new runner that is created, called "lib\cloudplatform_action_runner.py." This is a small file which has two imports—the CloudPlatformRunner class from the "lib\cloudplatform_manager.py" file, as well as the untestable StackStorm® import. The run method here only has one line of code in it, and that is to run the "run_cloudplatform_method" method from the CloudPlatformRunner class and return the output. The "run_cloudplatform_method" in the CloudPlatformRunner class instantiates the CloudPlatformAPIManager class with the correct credentials, API and API version from the input parameters, creates a client in the cloud platform for the specific cloud platform API that the user is trying to use, and returns the result of the CloudPlatformAPIManager class's "run_method" with the remaining parameters passed to it as "kwargs."

The CloudPlatformAPIManager class is advantageously completely dynamic. The "run_method" method in the CloudPlatformAPIManager class is the method which will dynamically run any of the CloudPlatform's API calls (e.g., past, present and future) with whatever parameters are desired. To do so, the "run_method" method performs the following steps. The input "kwargs" is run though a method ("clean_args") that "cleans" the inputs. Since this action is generic for all API calls, the dictionary contains parameters which have no value and cannot be sent to the API. Thus, the code performs a deep copy to make a duplicate in memory. The code then loops through and removes all the empty parameters from the kwargs copy, and then returns the copy which has no unused parameters. The next task it does is to check if there is a "body" parameter in the kwargs input. If so, the code applies formatting (e.g., JSON formatting) to ensure the loads call succeeds every time, and performs a load string (e.g., JSON loads) and overwrites the existing body in the kwargs input with the formatted body (e.g., the new JSON formatted body). Next, the code takes the inputted method name which comes directly from the CloudPlatform's API documentation. The code splits the name on designated delimiters (e.g., periods) and puts those values in a list. The code sets the initial value of the method to "self.client" which is the CloudPlatform client (e.g., a Python client) that was created when the class was instantiated. The list is then looped through and the methods are run until the last one is reached. Once at the last entry in the list, the kwargs input is passed in and executed to return the output of the executed API call. Thus, unlike conventional approaches for building code, illustrative embodiments do not know or even care what the user is trying to run, as the code just simply automates running the correct API call with the user's inputs and returns the result. Also, since the code which actually does the work is in its own file with no imports (e.g., no StackStorm® imports), unit tests (e.g., Python unit tests) may be utilized for testing the code (e.g., with 100% code coverage of test cases).

Figure 5:
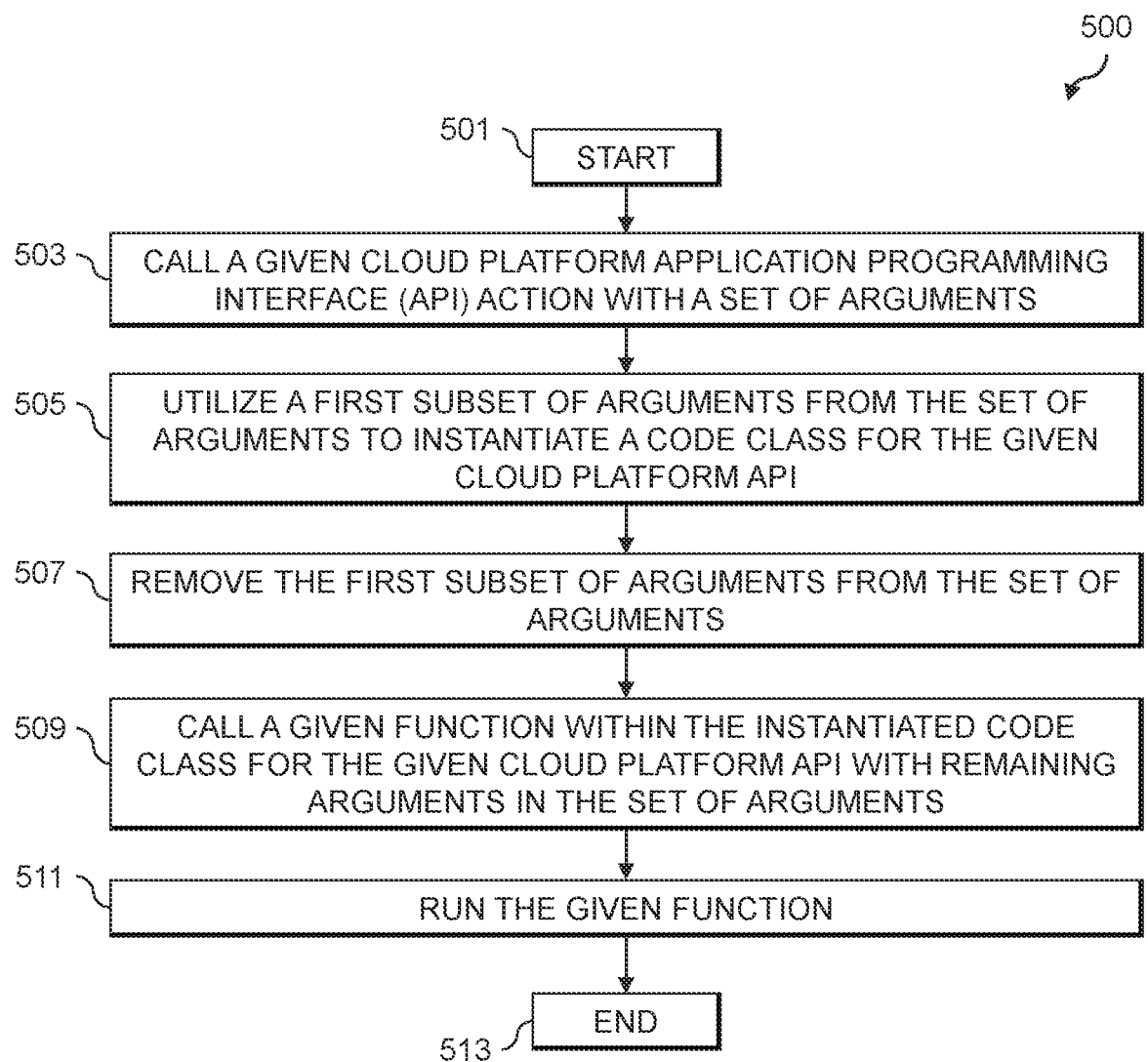
FIG. 5 shows a process flow executing an action on a cloud asset utilizing a dynamic cloud platform application programming interface call in an illustrative embodiment.

FIG. 5 shows a process flow 500 for executing an action on a cloud asset utilizing a dynamic cloud platform API call. The process flow 500 starts 501, and in step 503 a given cloud platform API action is called with a set of arguments. In step 505, a first subset of the arguments from the set of arguments is utilized to instantiate a code class for the given cloud platform API. The first subset of the set of arguments may include identifiers of the given cloud platform API, a particular version of the given cloud platform API, a set of credentials for the given cloud platform API and/or cloud asset on which the action is to be executed, etc. In step 507, the first subset of the set of arguments is removed from the set of arguments. A given function within the instantiated code class for the given cloud platform API is called in step 509 with the remaining arguments in the set of arguments. In step 511, the given function is run, and then the process flow 500 ends 513.

Figure 6A:
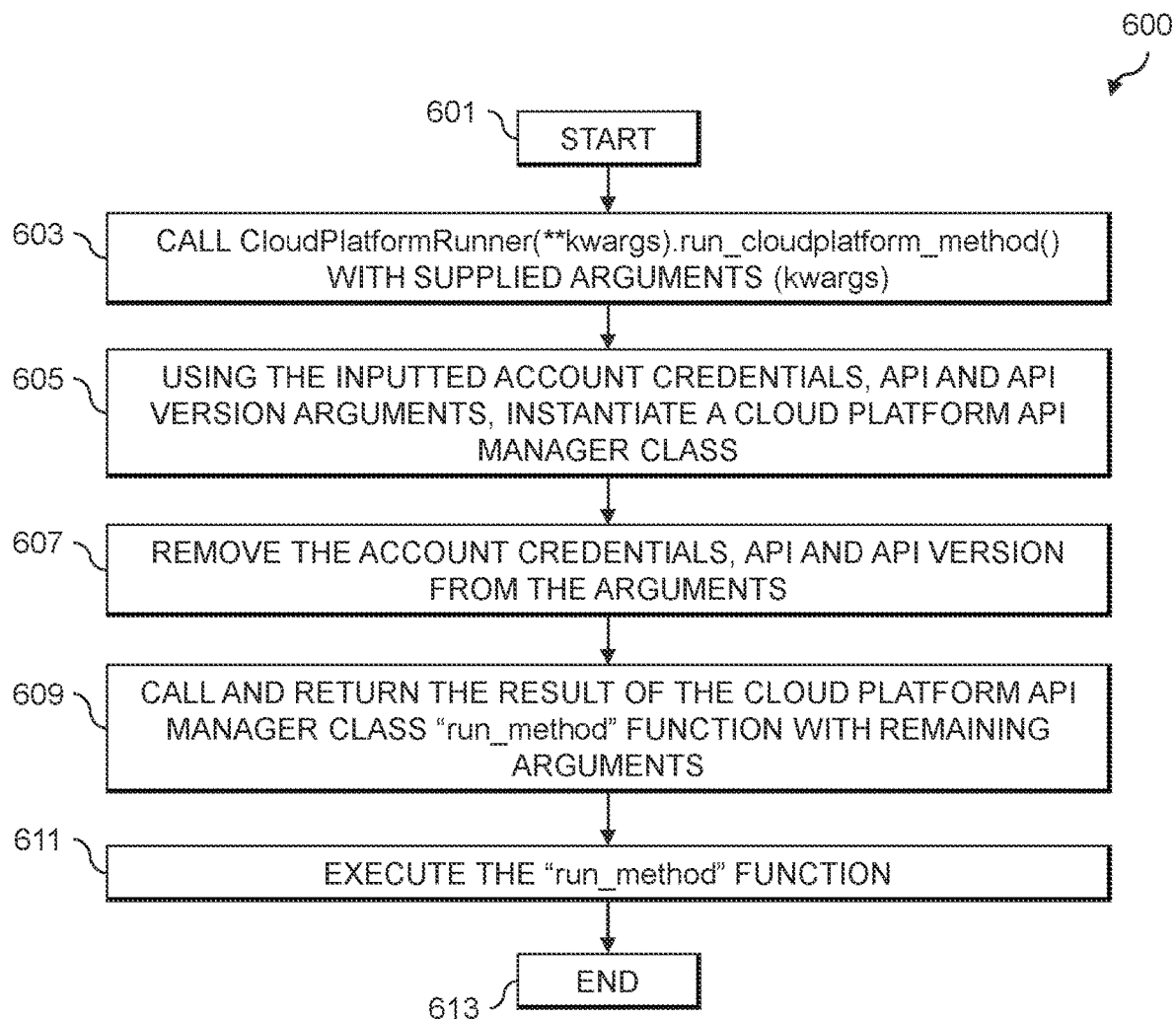
FIGS. 6A and 6B show another process flow executing an action on a cloud asset utilizing a dynamic cloud platform application programming interface call in an illustrative embodiment.
Figure 6B:
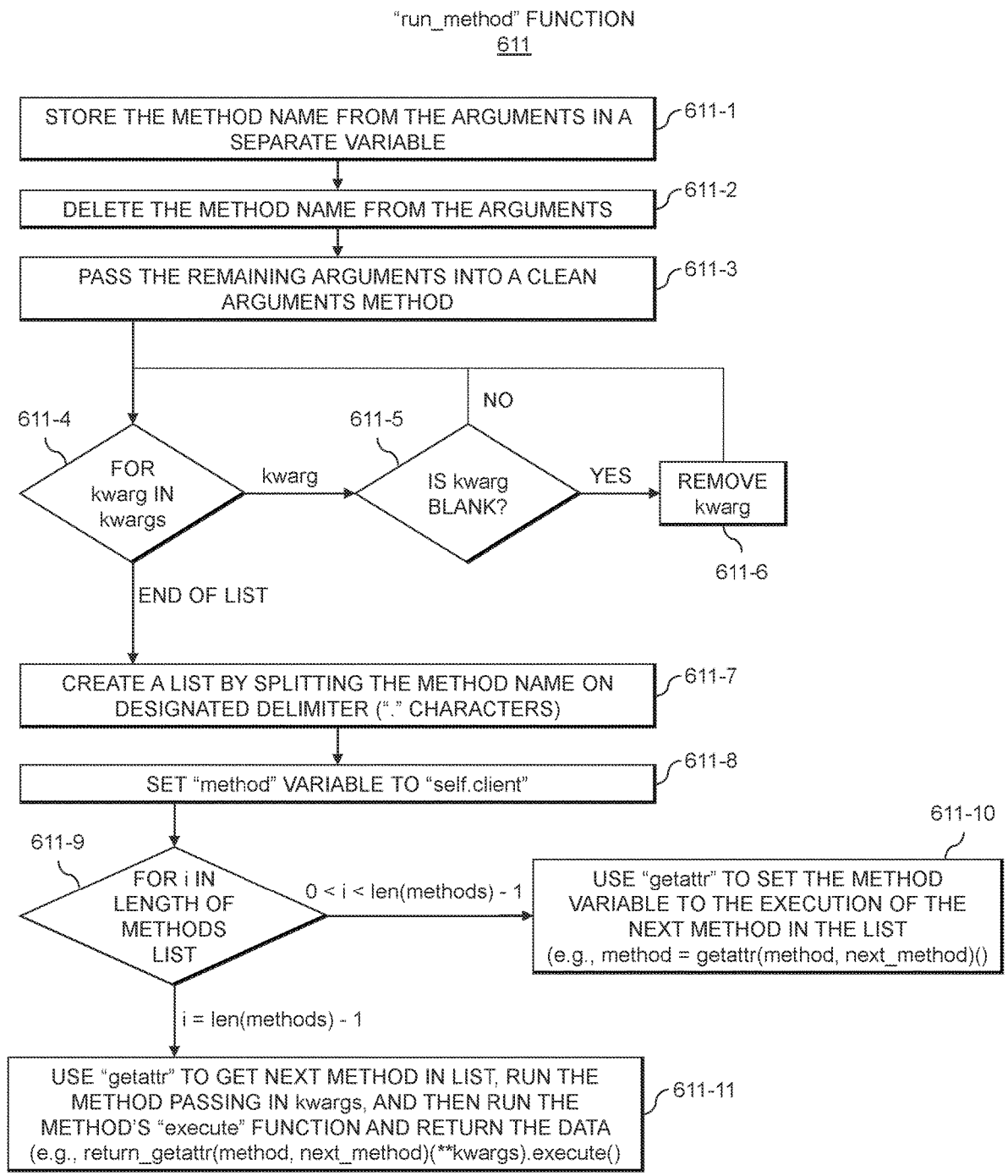

FIGS. 6A and 6B show a process flow 600 for executing an action on a cloud asset utilizing a dynamic cloud platform API call. As shown in FIG. 6A, the process flow 600 starts 601 and in step 603 CloudPlatformRunner(**kwargs).run_cloudplatform_method() is called with a set of supplied arguments (e.g., kwargs). In step 605, the inputted account credentials, API and API version arguments (e.g., from kwargs) are used to instantiate a cloud platform API manager class. The account credentials, API and API version arguments are then removed from the arguments (kwargs) in step 607. In step 609, the "run_method" function of the cloud platform API manager class is called with the remaining arguments. The "run_method" function is then executed in step 611, and then the process flow 600 ends 613.

As shown in FIG. 6B, step 611 includes storing the method name from the arguments (e.g., kwargs) in a separate variable (var) in step 611-1. In step 611-2, the method name is deleted from the arguments (e.g., kwargs). The remaining arguments are passed into a clean arguments method (e.g., clean_args) in step 611-3, and are then parsed. In step 611-4, a determination is made as to whether there are any unprocessed arguments in the remaining arguments (kwargs). For each unprocessed argument (kwarg) in kwargs, processing proceeds to step 611-5. In step 611-5, a determination is made as to whether that unprocessed argument (kwarg) is blank. If the result of the step 611-5 determination is no, processing returns to step 611-4 and the next unprocessed argument in the list. If the result of the step 611-5 is yes, that unprocessed argument (kwarg) is removed in step 611-6. When step 611-4 reaches the end of the list, processing proceeds to step 611-7 where a list is created by splitting the method name on a designated delimiter (e.g., period "." characters). In step 611-8, the "method" variable is set to "self.client" (e.g., a CloudPlatform client created when the CloudPlatformRunner class was initiated). In step 611-9, the methods list is processed. For each i in the length of the methods list, processing proceeds either to step 611-10 or 611-11. Processing proceeds to step 611-10 when 0<i<len (methods)-1. In step 611-10, "getattr" is used to set the method variable to the execution of the next method in the list (e.g., method=getattr(method, next method)()). Processing proceeds to step 611-11 when i=len(method)-1. In step 611-11, "getattr" is used to get the next method in the list, and that method is run by passing in the remaining arguments (kwargs) and running the "execute" function to return the data (e.g., return_getattr(method, next_method) (**kwargs).execute()).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for dynamic generation of cloud platform API calls will now be described in greater detail with reference to FIGS. 7 and 8. Although described in the context of system 100, these platforms may also be used to implement at least portions of other information processing systems in other embodiments.

Figure 7:
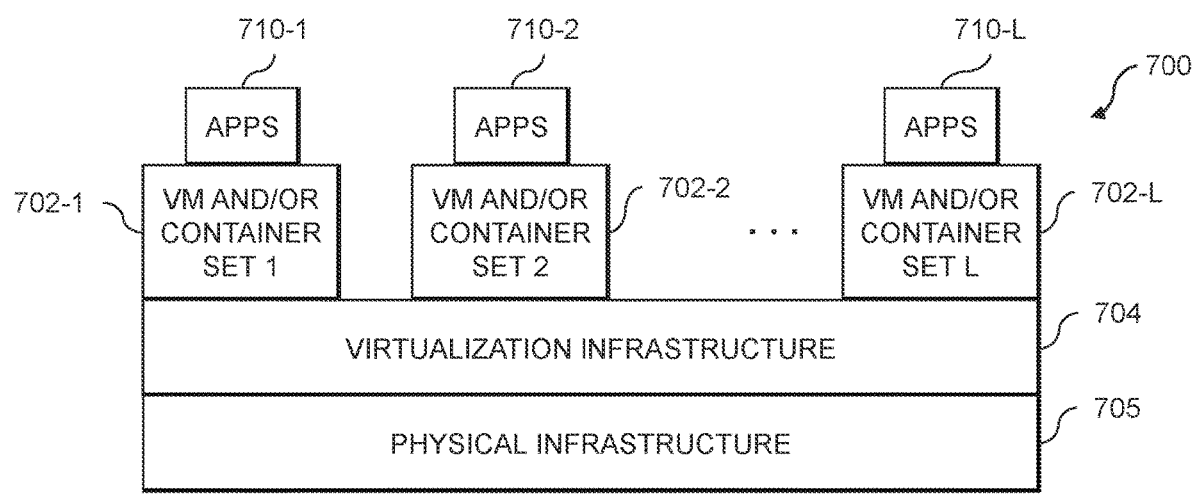
FIGS. 7 and 8 show examples of processing platforms that may be utilized to implement at least a portion of an information processing system in illustrative embodiments.
Figure 8:
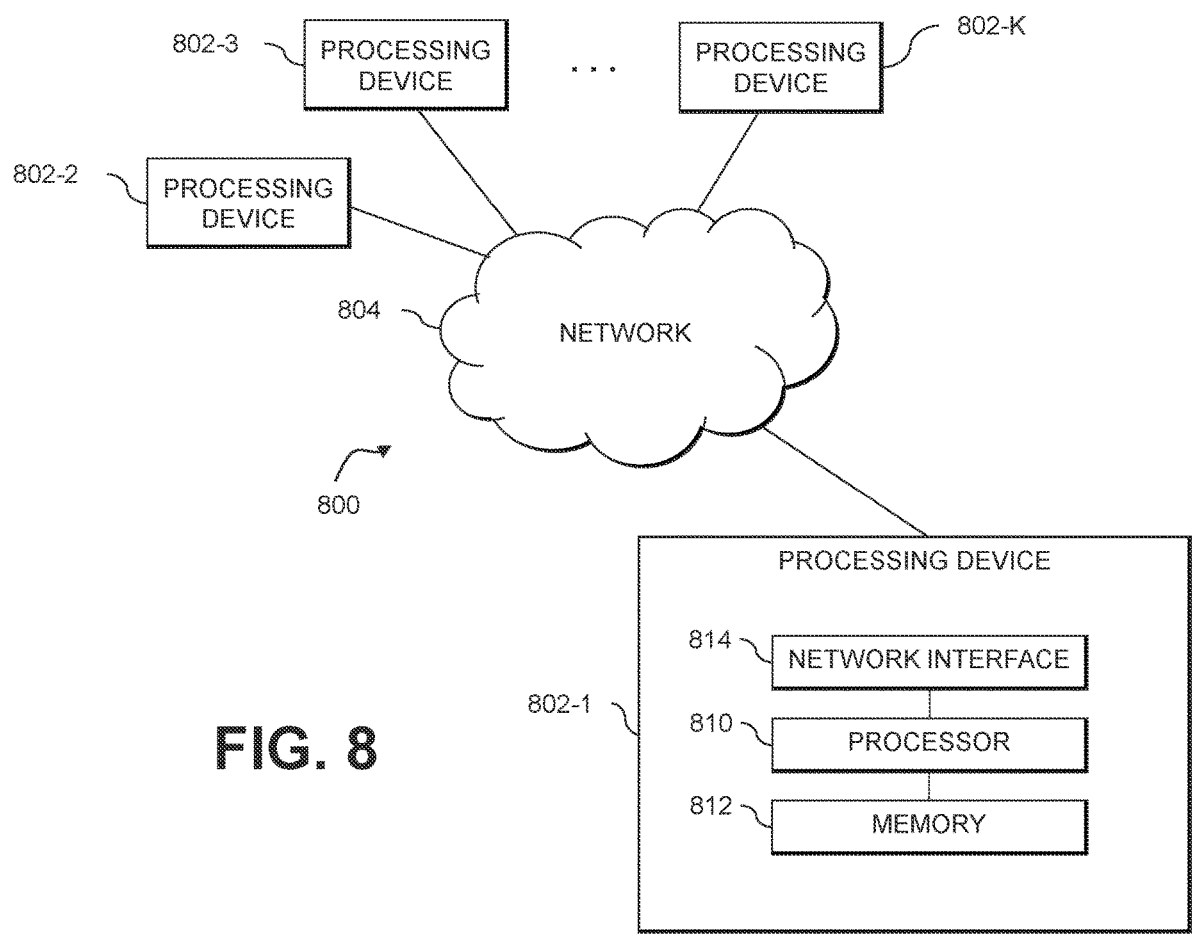

FIG. 7 shows an example processing platform comprising cloud infrastructure 700. The cloud infrastructure 700 comprises a combination of physical and virtual processing resources that may be utilized to implement at least a portion of the information processing system 100 in FIG. 1. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, ... 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for dynamic generation of cloud platform API calls as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, cloud platforms, APIs, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
receiving a request to execute an action on one or more cloud assets of a cloud platform utilizing an application programming interface exposed by the cloud platform, the request comprising a set of keyword arguments;
generating a code class instance for the application programming interface exposed by the cloud platform;
instantiating, via the generated code class instance, a client for the cloud platform utilizing a first subset of arguments in the set of keyword arguments;
determining, from the set of keyword arguments, an identifier of the action to be executed on the one or more cloud assets of the cloud platform utilizing the application programming interface exposed by the cloud platform; and
executing the action on the one or more cloud assets of the cloud platform by running a function of the generated code class instance, the function dynamically generating an application programming interface call in the application programming interface exposed by the cloud platform utilizing the instantiated client for the cloud platform, the determined identifier, and a second subset of arguments in the set of keyword arguments.

2. The apparatus of claim 1 wherein the function of the generated code class instance is generic to each of a plurality of different application programming interface calls in the application programming interface exposed by the cloud platform.

3. The apparatus of claim 1 wherein the first subset of arguments in the set of keyword arguments comprises an identifier of the cloud platform application programming interface, an identifier of a given version of the cloud platform application programming interface, and a set of credentials for the cloud platform.

4. The apparatus of claim 1 wherein the first subset of arguments is removed from the set of keyword arguments subsequent to instantiating the client for the cloud platform.

5. The apparatus of claim 1 wherein running the function of the generated code class instance comprises:
 storing the determined identifier in a separate variable; and
 removing the determined identifier from the set of arguments.

6. The apparatus of claim 1 wherein running the function of the generated code class instance comprises cleaning the second subset of arguments in the set of keyword arguments, the second subset of arguments in the set of keyword arguments comprising remaining arguments in the set of keyword arguments other than the first subset of arguments and the determined identifier.

7. The apparatus of claim 6 wherein cleaning the second subset of arguments in the set of keyword arguments comprises removing any remaining arguments in the set of keyword arguments that have blank values.

8. The apparatus of claim 1 wherein running the function of the generated code class instance comprises:
 creating a list by splitting the determined identifier based at least in part on one or more designated delimiter characters; and
 iterating through the created list to generate a call for the function of the generated code class instance.

9. The apparatus of claim 8 wherein the one or more designated delimiter characters comprise periods.

10. The apparatus of claim 8 wherein iterating through the created list to generate a call for the function of the generated code class instance comprises:
 setting a method variable to an identifier of the instantiated client for the cloud platform; and
 for each entry in the created list, comparing an index value of a current entry in the list to a total number of entries in the created list.

11. The apparatus of claim 10 wherein iterating through the created list to generate a call for the function of the generated code class instance further comprises, responsive to the index value of the current entry in the list being less than a total number of entries in the created list minus one, appending the current entry of the created list to the method variable and incrementing the index value.

12. The apparatus of claim 10 wherein iterating through the created list to generate a call for the function of the generated code class instance further comprises, responsive to the index value of the current entry in the list being equal to a total number of entries in the created list minus one:
 appending the current entry of the created list to the method variable; and
 generating the call comprising (i) the method variable with the second subset of arguments in the set of arguments passed as parameters and (ii) an execution instruction.

13. The apparatus of claim 1 wherein the one or more cloud assets of the cloud platform comprise at least one of virtual computing resources and physical computing resources.

14. The apparatus of claim 13 wherein the request to execute the action on the one or more cloud assets of the cloud platform comprises at least one of:
 a request to create a given one of the one or more cloud assets; and
 a request to modify a configuration of the given one of the one or more cloud assets.

15. A computer program product comprising a non-transitory processor-readable storage medium having stored therein program code of one or more software programs, wherein the program code when executed by at least one processing device causes the at least one processing device to perform steps of:
 receiving a request to execute an action on one or more cloud assets of a cloud platform utilizing an application programming interface exposed by the cloud platform, the request comprising a set of keyword arguments;
 generating a code class instance for the application programming interface exposed by the cloud platform;
 instantiating, via the generated code class instance, a client for the cloud platform utilizing a first subset of arguments in the set of keyword arguments;
 determining, from the set of keyword arguments, an identifier of the action to be executed on the one or more cloud assets of the cloud platform utilizing the application programming interface exposed by the cloud platform; and
 executing the action on the one or more cloud assets of the cloud platform by running a function of the generated code class instance, the function dynamically generating an application programming interface call in the application programming interface exposed by the cloud platform utilizing the instantiated client for the cloud platform, the determined identifier, and a second subset of arguments in the set of keyword arguments.

16. The computer program product of claim 15 wherein the function of the generated code class instance is generic to each of a plurality of different application programming interface calls in the application programming interface exposed by the cloud platform.

17. The computer program product of claim 15 wherein the one or more cloud assets of the cloud platform comprise at least one of virtual computing resources and physical computing resources, and wherein the request to execute the action on the one or more cloud assets of the cloud platform comprises at least one of: a request to create a given one of the one or more cloud assets; and a request to modify a configuration of the given one of the one or more cloud assets.

18. A method comprising:
 receiving a request to execute an action on one or more cloud assets of a cloud platform utilizing an application programming interface exposed by the cloud platform, the request comprising a set of keyword arguments;
 generating a code class instance for the application programming interface exposed by the cloud platform;
 instantiating, via the generated code class instance, a client for the cloud platform utilizing a first subset of arguments in the set of keyword arguments;
 determining, from the set of keyword arguments, an identifier of the action to be executed on the one or more cloud assets of the cloud platform utilizing the application programming interface exposed by the cloud platform; and executing the action on the one or more cloud assets of the cloud platform by running a function of the generated code class instance, the function dynamically generating an application programming interface call in the application programming interface exposed by the cloud platform utilizing the instantiated client for the cloud platform, the determined identifier, and a second subset of arguments in the set of keyword arguments;

wherein the method is performed by at least one processing device comprising a processor coupled to a memory.

19. The method of claim 18 wherein the function of the generated code class instance is generic to each of a plurality of different application programming interface calls in the application programming interface exposed by the cloud platform.

20. The method of claim 18 wherein the one or more cloud assets of the cloud platform comprise at least one of virtual computing resources and physical computing resources, and wherein the request to execute the action on the one or more cloud assets of the cloud platform comprises at least one of: a request to create a given one of the one or more cloud assets; and a request to modify a configuration of the given one of the one or more cloud assets.

* * * * *